US008237105B1

(12) United States Patent
Bulatowicz et al.

(10) Patent No.: US 8,237,105 B1
(45) Date of Patent: Aug. 7, 2012

(54) MAGNETO-OPTICAL TRAP FOR COLD ATOM BEAM SOURCE

(75) Inventors: Michael D. Bulatowicz, Canoga Park, CA (US); Michael S. Larsen, Woodland Hills, CA (US)

(73) Assignee: Northrop Grumman Guidance & Electronics Company, Inc., Woodland Hills, CA (US)

( * ) Notice: Subject to any disclaimer, the term of this patent is extended or adjusted under 35 U.S.C. 154(b) by 9 days.

(21) Appl. No.: 13/020,432

(22) Filed: Feb. 3, 2011

(51) Int. Cl.
*H05H 3/00* (2006.01)
*H05H 3/02* (2006.01)
*H01S 3/00* (2006.01)

(52) U.S. Cl. ........................ 250/251; 315/111.41; 331/3

(58) Field of Classification Search .................. 250/251; 315/111.41; 331/3
See application file for complete search history.

(56) References Cited

U.S. PATENT DOCUMENTS 6,303,928 B1 * 10/2001 Buell et al. .................... 250/251
6,476,383 B1 * 11/2002 Esslinger et al. ............. 250/251
7,081,623 B2 7/2006 Pai et al.
7,126,112 B2 10/2006 Anderson et al.
7,459,673 B2 * 12/2008 Katori ........................... 250/251
2001/0042824 A1 11/2001 Bouyer et al.
2003/0039753 A1 2/2003 Marsh
2005/0086946 A1 4/2005 Song et al.
2005/0199871 A1 9/2005 Anderson et al.
2008/0296483 A1 12/2008 McClelland et al.

FOREIGN PATENT DOCUMENTS

WO WO 03/065774 A1 8/2003
WO WO 2007/034174 A2 3/2007

* cited by examiner

*Primary Examiner* — Nikita Wells

(74) *Attorney, Agent, or Firm* — Tarolli, Sundheim, Covell & Tummino LLP

(57) ABSTRACT

One embodiment of the invention includes a magneto-optical trap (MOT) housing substantially surrounding atoms in an atom trapping region. The housing includes a first end that is substantially open to receive light that is substantially collimated and a second end opposite the first end that includes an aperture that emits a cold atom beam from the atom trapping region. The housing also includes a housing section surrounding and extending along a substantially central axis having a substantially reflective interior peripheral surface that reflects the light to generate an optical force on the atoms. The housing further includes an optical mask located substantially at the first end and along the substantially central axis that is configured to occlude the atom trapping region from the light to substantially prevent direct illumination of the atoms by unreflected light.

20 Claims, 6 Drawing Sheets

MAGNETO-OPTICAL TRAP FOR COLD ATOM BEAM SOURCE

TECHNICAL FIELD

The invention relates generally to a cold atom beam source and, more specifically, to a magneto-optical trap for a cold atom beam source.

BACKGROUND

Cold atom beam sources can be utilized in various systems which require extremely accurate and stable frequencies, such as atomic clocks. As an example, atomic clocks can be used in bistatic radar systems, global positioning systems (GPS), and other navigation and positioning systems, such as satellite systems. Atomic clocks can also be used in communications systems, such as cellular phone systems. Some cold atom beam sources can include a magneto-optical trap (MOT). A MOT functions by trapping atoms, such as Cesium (Cs) or Rubidium (Rb), in an atom trapping region, and may be configured such that the atoms can be emitted as a substantially collimated atom beam from an aperture. Thus, the emitted cold atom beam can be implemented as a frequency reference, replacing the more typical hot atom beam.

SUMMARY

One embodiment of the invention includes a magneto-optical trap (MOT) housing substantially surrounding atoms in an atom trapping region. The housing includes a first end that is substantially open to receive light that is substantially collimated and a second end opposite the first end that includes an aperture that emits a cold atom beam from the atom trapping region. The housing also includes a housing section surrounding and extending along a substantially central axis having a substantially reflective interior peripheral surface that reflects the light to generate an optical force on the atoms. The housing further includes an optical mask located substantially at the first end and along the substantially central axis that is configured to occlude the atom trapping region from the light to substantially prevent direct illumination of the atoms by unreflected light.

Another embodiment of the invention includes a method for generating a cold atom beam. The method includes generating a magnetic field having a magnitude that is approximately zero at an atom trapping region that is substantially surrounded by a MOT housing that extends along a substantially central axis. The magnetic field can increase in substantially all directions from the atom trapping region. The method also includes providing substantially collimated light to a substantially open first end of the MOT housing. The method also includes occluding the atom trapping region from the light that is provided to the first end via an optical mask located approximately at the first end along a substantially central axis. The method further includes generating an optical force on the atoms in the atom trapping region based on the substantially collimated light. The optical force can have a force component in a direction toward an aperture located at a second end of the MOT housing opposite the first end to form the cold atom beam based on the atoms in the atom trapping region.

Another embodiment of the invention includes a MOT housing substantially surrounding atoms in an atom trapping region. The housing includes a first end that is substantially open to receive light that is substantially collimated and a second end opposite the first end that includes an aperture that emits a cold atom beam from the atom trapping region. The housing also includes a first housing section surrounding and extending along a substantially central axis that extends through the atom trapping region and the aperture. The first housing section having a substantially reflective interior peripheral surface that orthogonally reflects the light to generate an optical force on the atoms toward the substantially central axis. The housing also includes a second housing section coupled to the first housing section and surrounding and extending along the substantially central axis. The second housing section has a substantially reflective interior peripheral surface that reflects the light in a direction toward the atom trapping region to generate an optical force on the atoms in the atom trapping region in a direction toward the aperture. The housing further includes an optical mask located substantially at the first end and along the substantially central axis that is configured to occlude the atom trapping region from the light to substantially prevent direct illumination of the atoms by unreflected light.

DETAILED DESCRIPTION

Figure 1:
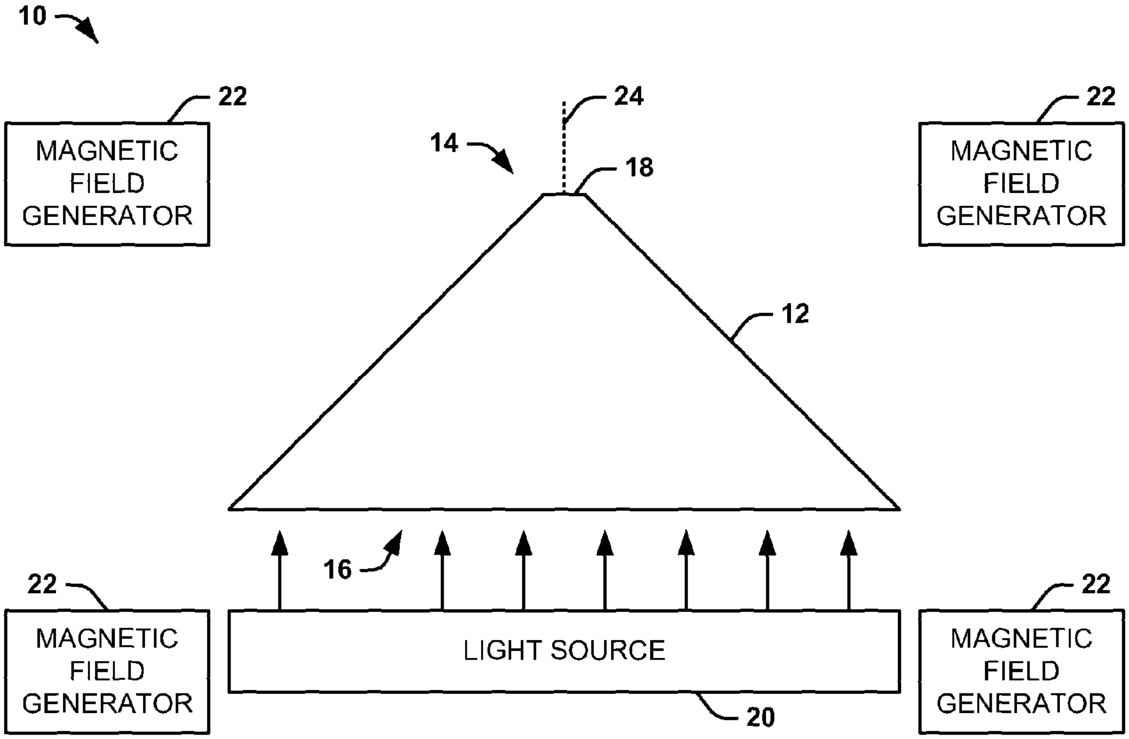
FIG. 1 illustrates an example of a magneto-optical trap (MOT) system in accordance with an aspect of the invention.

The invention relates generally to a cold atom beam source and, more specifically, to a magneto-optical trap for a cold atom beam source. The MOT includes a housing section that can be substantially conical or substantially pyramidal (e.g., having an even number of planar surfaces) and which substantially surrounds atoms in an atom trapping region. The atoms can be alkali metal atoms, such as Cesium (Cs) or Rubidium (Rb). The housing section can have a substantially reflective interior peripheral surface that is illuminated with collimated, circularly-polarized trapping light and re-pump light. The trapping light can have a frequency that is red-detuned with respect to a specific atomic transition of the atoms in the atom trapping region. The re-pump light can have a frequency that is substantially resonant with an atomic transition that cannot absorb the trapping light. As described herein, reference to the trapping light also includes the co-propagating re-pump light based on the necessity of the re-pump light for the atom trapping process. As also described herein, a red-detuned frequency is a frequency (i.e., of the trapping light and not the re-pump light) that is slightly less than an atomic resonance frequency associated with the atoms in the atom trapping region. Thus, the atoms in the atom trapping region are significantly less likely to absorb photons of the trapping light.

The illumination of the collimated, circularly-polarized trapping light and a surrounding quadrupole magnetic field generates the atom trapping region to trap the atoms based on an optical force generated by the trapping light combined with the magnetic field. As an example, the magnetic field can have a null magnitude that is substantially centered at the trapping region and which increases in all directions from the trapping region. The non-zero magnetic field can shift the atomic resonance frequencies of the atoms as they leave the atom trapping region, such that the atoms can be more likely to absorb light directed toward the trapping region than light that is directed away from the trapping region. The trapping light substantially uniformly illuminates the interior surface of the MOT housing and reflects from the interior peripheral surface of the MOT to substantially converge along a substantially central axis that passes through the trapping region and an aperture. Thus, the atoms are substantially trapped based on both the surrounding magnetic field and an optical force of the absorption-emission cycles of the photons from the trapping light resulting from changes in resonance based on both the Doppler shift of the alkali metal particles upon gaining momentum in the opposite direction of the colliding red-detuned photons and a Zeeman shift in the atomic resonance frequencies induced by the magnetic field.

As an example, the substantially reflective interior peripheral surface of the MOT housing is structured in such a manner as to provide counter-propagating beams of the trapping light with a net intensity sum in the direction of the aperture. Therefore, the net intensity of light provides a component of force on the trapping region to accelerate atoms out of the trapping region as a cold atom beam without allowing any of the incoming or reflected light to escape the MOT housing through the aperture. The MOT housing can include an optical mask near the opening that receives the trapping light along the substantially central axis that occludes the atom trapping region from the trapping light in the axis of the atomic beam. As a result, there is no unwanted interaction between the trapping light and the atomic beam. Instead, a desired average velocity of the atomic beam can be optimized based on a light intensity profile of the trapping light, the shape of the mirrored interior of the MOT, and light detuning of the trapping light. The desired average velocity can thus be optimized up to a maximum limit that can result in a Doppler shift that is too large for the light to accelerate the alkali metal particles out of the MOT any faster (e.g., 10 meters per second for Cs).

FIG. 1 illustrates an example of a MOT system 10 in accordance with an aspect of the invention. The MOT system 10 is configured to generate a cold atom beam based on trapping atoms. The atoms can be alkali metal atoms, such as Cs or Rb. The MOT system 10 can be implemented in a variety of applications, such as an atomic clock.

The MOT system 10 includes a MOT housing 12 that includes a first end 16 and a second end 14. The MOT housing 12 has a shape that is substantially tapered from the first end 16 to the second end 14. As an example, the MOT housing 12 can be arranged to have a substantially conical shape. As another example, the MOT housing 12 can be arranged to have a substantially pyramidal shape, such that it has an even number of planar sides (e.g., four or more). It is to be understood that the MOT housing 12 could include two planar sides, such that the MOT system 10 could also include an additional confinement system for an axis substantially parallel to the two planar sides of the MOT housing 12. The second end 14 includes an aperture 18 from which the cold atom beam is emitted. The first end 16 is substantially open to receive the collimated circularly-polarized beam of light from a light source 20. The light that is generated by the light source 20 can have a frequency that is red-detuned with respect to the atoms to be trapped within the MOT housing 12, such that the frequency of the light is slightly less than an atomic resonance frequency of the atoms. The interior peripheral surface of the MOT housing 12 can be substantially reflective to reflect the light within the MOT housing 12.

As described in greater detail below, the light is configured to generate an optical force on the atoms in the MOT housing 12 to generate a trapping region that is substantially surrounded by the MOT housing 12. The MOT system 10 also includes a set of magnetic field generators 22 that generate a quadrupole magnetic field having a magnetic field magnitude that is approximately zero centered at the atom trapping region within the MOT housing 12. The magnetic field thus increases in magnitude in all directions emanating from the atom trapping region. Therefore, the atom trapping region is substantially defined by the quadrupole magnetic field as a volume of space within the MOT housing 12 having a very low or approximately zero magnitude quadrupole magnetic field. The magnetic field generators 22 can be arranged with respect to the MOT housing 12 such that the atom trapping region is substantially centered at a point located along a substantially central axis 24 along which the cold atom beam is emitted through the aperture 18. As also described in greater detail below, the MOT housing 12 can include an optical mask located along the central axis 24 that occludes the atom trapping region from direct illumination from the light generated by the light source 20.

The light that is emitted from the light source 20 can be reflected orthogonally within the MOT housing 12, such that the beams of light intersect each other in opposite directions along the central axis 24. As atoms travel in a direction that includes a component of velocity parallel to a beam of light, the beams of light will have a Doppler-shifted frequency with respect to the atom that is dependent on the velocity of the atom. Thus, a red-detuned beam of light propagating in an opposite direction of the velocity of the atom will have a frequency that is shifted up and may be closer to the atomic resonance frequency of the atom. As a result, atom is much more likely to absorb a photon of the beam of light propagating in the opposite direction of the velocity of the atom relative to other beams of light. Upon absorbing the photon, the atom will emit a photon of approximately equal energy in a random direction. Accordingly, when the atom absorbs multiple photons from oppositely propagating light beams emits each of the approximately equal energy photons in random directions, the atom experiences an average net optical force in the direction of the oppositely propagating light beams. As a result, the net effect of trapping light in substantially all three spatial axes is to slow the velocity of traveling atoms in all three directions.

The quadrupole magnetic field generated by the magnetic field generators 22 is configured to substantially increase the optical force at points outside the trapping region. Specifically, the effect of the magnetic field is to separate the energy levels between the hyperfine ground states of the atoms based on intrinsic magnetic moments of the atoms (e.g., electron and nuclear spin). As a result, the resonance frequency associated with the specific hyperfine transitions in the atoms is substantially decreased in the greater magnitude field magnitudes in regions away from the trapping region. Therefore, atoms that travel with a velocity component away from the trapping region absorb more photons from the light beams having propagation in the opposite direction, which thus increases the optical force on the atoms in directions toward the trapping region (e.g., generating an optical "molasses"). In addition, the quadrupole magnetic field in combination with the circularly-polarized trapping light generates a position-dependent restoring force which exerts an optical force on the atoms in a direction toward the trapping region. Accordingly, the atoms substantially enclosed within the MOT housing 12 are substantially forced into the trapping region based on a net effect of the light emitted from the light source 20 and the magnetic field generated by the magnetic field generators 22.

The MOT housing 12 can be configured to include two or more sections that are configured to reflect the light beams generated by the light source 20 to both trap the atoms in the trapping region, as described above, and to generate a net optical force on the trapping region that pushes the atoms out of the trapping region as a cold atom beam along the central axis 24. As an example, one of the sections of the MOT housing 12 can be arranged to have an angle relative to a plane that is normal to the central axis such that this section reflects the light toward the atom trapping region in a manner that pushes the atoms in the direction of the aperture 18 to be emitted as a cold atom beam. In addition, because of the optical mask that occludes the atom trapping region from direct illumination from the light generated by the light source 20, none of the light beams exit the MOT housing 12 through the aperture 18. Accordingly, the optical mask substantially mitigates the occurrence of optical forces acting upon the cold atom beam subsequent to being emitted from the aperture 18.

Figure 2:
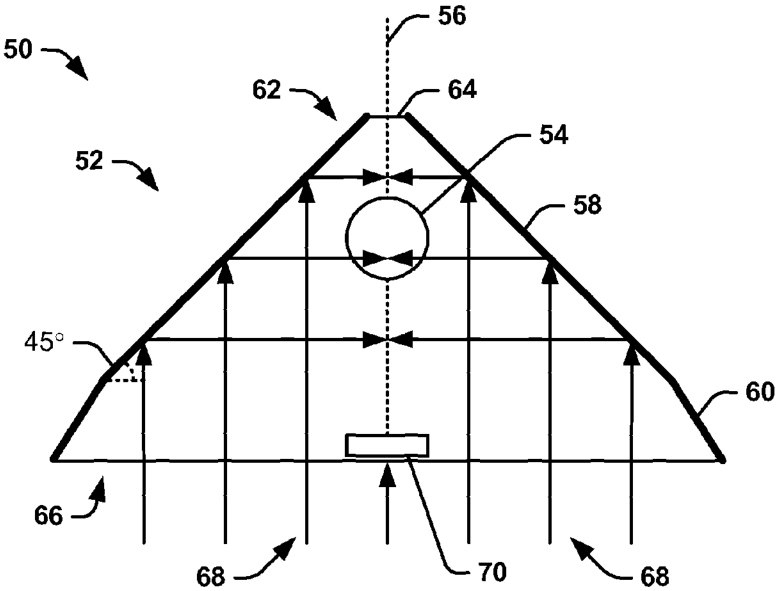
FIG. 2 illustrates an example of a diagram of light reflection in a cross-section of a MOT housing in accordance with an aspect of the invention.

FIG. 2 illustrates an example of a diagram 50 of light reflection in a cross-section of a MOT housing 52 in accordance with an aspect of the invention. The MOT housing 52 can correspond to the MOT housing 12 of the MOT system 10 in the example of FIG. 1. Therefore, reference is to be made to the example of FIG. 1 in the following description of the example of FIG. 2.

The MOT housing 52 is demonstrated in the example of FIG. 2 as substantially surrounding an atom trapping region 54. Similar to as described above, the atom trapping region 54 can be substantially defined as a volume having a center that is located at a substantially central axis 56 and at which a quadrupole magnetic field, such as generated by the magnetic field generators 22, has a magnitude of approximately zero. The MOT housing 52 includes a first housing section 58 and a second housing section 60. The first housing section 58 is demonstrated as extending from a second end 62 of the MOT housing 52 that includes an aperture 64 to the second housing section 60 and substantially encloses the atom trapping region 54. The second housing section 60 extends from the first housing section 58 to a first end 66 of the MOT housing 52 that is substantially open. The first and second housing sections 58 and 60 can have substantially reflective interior peripheral surfaces, such that the entirety of the interior surface of the MOT housing 52 can be substantially reflective.

In the example of FIG. 2, collimated light beams 68 are provided into the first end 66 of the MOT housing 52, such as from the light source 20 in the example of FIG. 1. The first housing section 58 of the MOT housing 52 can be arranged to have a 45° angle with respect to a plane that is normal to the central axis 56. Therefore, the portions of the collimated light beams 68 that strike the interior peripheral surface of the first housing section 58 are orthogonally reflected toward the central axis 56. As a result, the light beams 68 generate an optical force along the central axis 56 which, combined with the quadrupole magnetic field that has a substantially zero magnitude at the trapping region 54 and increasing in magnitude in directions away from the trapping region, traps the atoms in the MOT housing 52 along the central axis 56. The light beams 68 continue to propagate past the central axis 56 to be orthogonally reflected back out of the opening of the first end 66. In addition, the MOT housing 52 includes an optical mask 70 that is substantially centered at a point along the central axis 56 to occlude the trapping region 54 from direct (i.e., unreflected) illumination from the collimated light beams 68. Therefore, there is substantially no optical force in the direction of the central axis 56 resulting from direct illumination of the light beams 68. Accordingly, substantially none of the light beams 68 emanate from the aperture 64 to provide an optical force on the atoms that are emitted from the aperture 64 as a cold atom beam.

Figure 3:
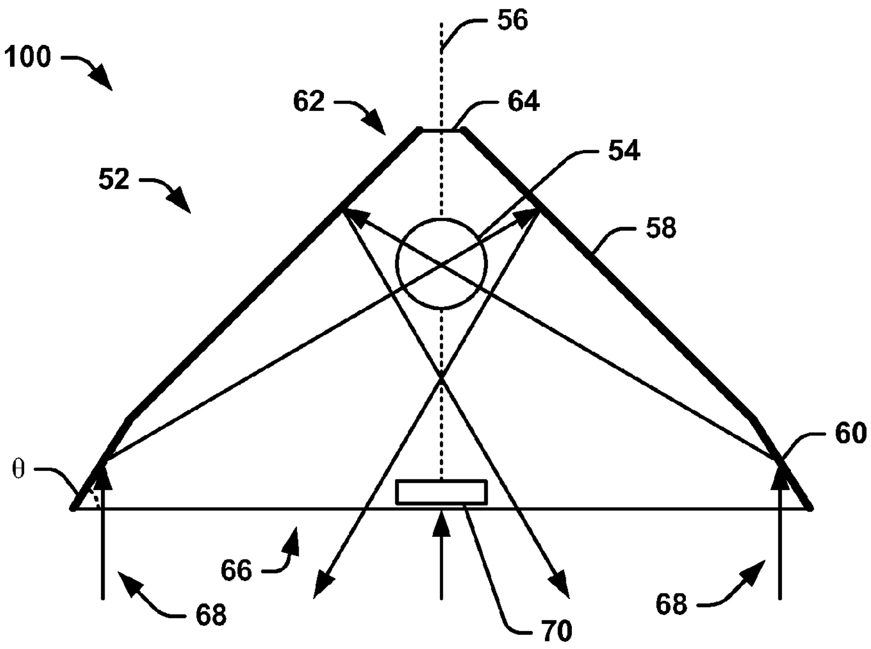
FIG. 3 illustrates another example of a diagram of light reflection in a cross-section of a MOT housing in accordance with an aspect of the invention.

FIG. 3 illustrates another example of a diagram 100 of light reflection in a cross-section of the MOT housing 52 in accordance with an aspect of the invention. In the example of FIG. 3, the second housing section 60 of the MOT housing 52 can be arranged to have an angle θ with respect to a plane that is normal to the central axis 56. The angle θ is demonstrated in the example of FIG. 3 to be an acute angle that is greater than 45°. Therefore, the second housing section 60 is configured to reflect the light beams 68 at an angle that directs the light beams 68 toward the atom trapping region 54. The illumination of the light beams 68 on the atoms that are trapped in the atom trapping region 54 thus creates an optical force having a force component in the direction of the aperture 64 along the central axis 56. As a result, the atoms that are trapped in the atom trapping region 54 are emitted from the aperture 64 as a cold atom beam. The light beams 68 that are reflected toward the atom trapping region 54 are reflected again from the interior peripheral surface of the first housing section 58 back out of the opening of the first end 66. Thus, none of the light beams 68 that reflect from the interior peripheral surface of the second housing section 60 are emitted from the aperture 64, and thus do not provide an optical force on the atoms subsequent to being emitted from the aperture 64 as the cold atom beam.

The magnitude of the force component in the direction of the aperture 64 can be controlled in a variety of different ways. One manner in which the force component can be controlled is based on the characteristics of the MOT housing 52. As an example, the angle θ can be controlled to control the angle at which the light beams 68 that are reflected from the interior peripheral surface of the second housing section 60 pass through the atom trapping region 54. The angle θ can be static, such as set at fabrication of the MOT housing 52, or can be dynamic, such as based on a system configured to change the angle θ during operation of the MOT housing 52 in an associated MOT system. As another example, the interior peripheral surface of the MOT housing 52 can be only partially reflective, can include cutout or non-reflective regions on the interior peripheral surface, and/or can have a reflectivity that changes along the length of the MOT housing 52.

Therefore, the intensity of the reflected light beams 68 can be changed to change the magnitude of the optical force.

Figure 4:
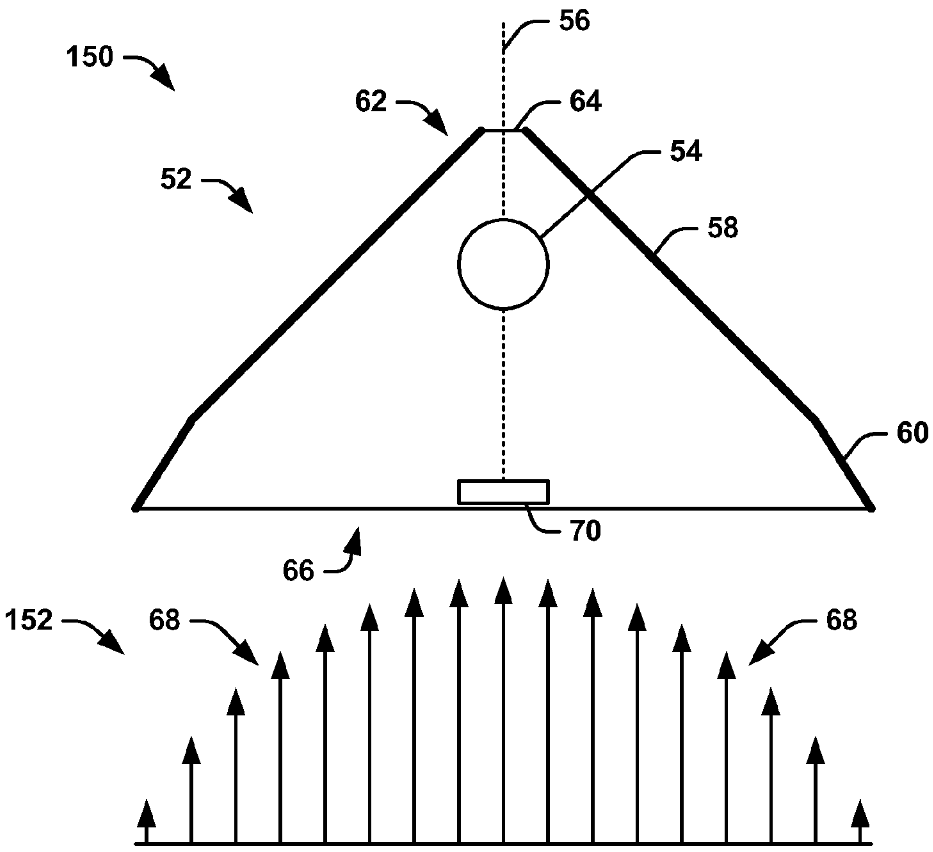
FIG. 4 illustrates an example of a diagram of a light intensity distribution to a MOT housing in accordance with an aspect of the invention.

FIG. 4 illustrates an example of a diagram 150 of a light intensity distribution 152 to the MOT housing 52 in accordance with an aspect of the invention. In the example of FIG. 4, the light intensity distribution 152 is demonstrated as a substantially Gaussian distribution. Specifically, the light beams 68 at the center of the light intensity distribution 152 have a highest intensity and the light beams 68 decrease in intensity toward the edges of the light intensity distribution 152 to a lowest intensity at the edges. The magnitude of the optical force component toward the aperture 64 to generate the cold atom beam can thus also be adjusted based on adjusting the size and/or configuration of the Gaussian light intensity distribution 152.

In the example of FIG. 3, the associated collimated light source, such as the light source 20, can be substantially centered at the central axis 56 and can have a width that is approximately equal to the width of the first end 66 of the MOT housing 52. Thus, because the light beams 68 have the least intensity at the edges of the light intensity distribution 152, the light beams 68 having substantially the least intensity are reflected from the second housing region 60 to the atom trapping region 54 to generate the optical force toward the aperture 64. However, the magnitude of the optical force component in the direction of the aperture 64 can be substantially increased based on increasing the width of the associated light source, and thus the width of the light intensity distribution 152. Therefore, the less intense edges of the light intensity distribution 152 can be located beyond the outer perimeter of the first end 66 of the MOT housing 52, such that light beams 68 of greater intensity are reflected from the interior peripheral surface of the second housing section 60. As another example, the overall intensity of the light source, and thus the light beams 68, can be increased to increase the optical force component in the direction of the aperture 64. As yet another example, the shape of the light intensity distribution 152 can be adjusted to control the magnitude of the optical force component in the direction of the aperture 64, such as by setting the light intensity distribution 152 to be substantially uniform or another shape instead of Gaussian.

Figure 5:
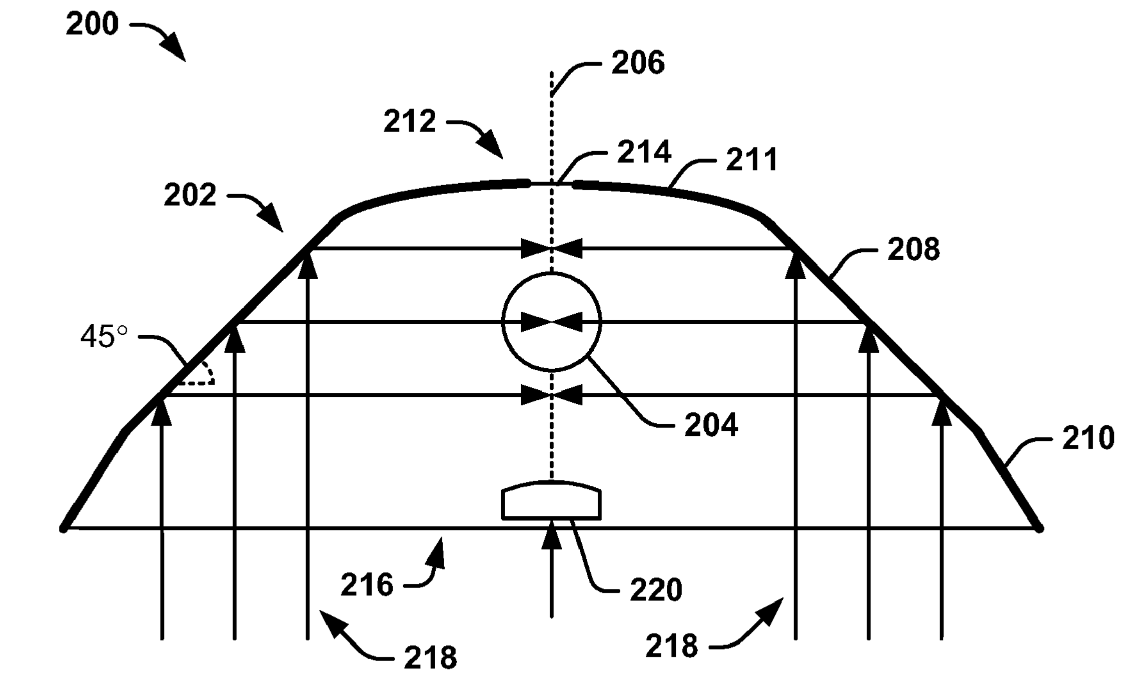
FIG. 5 illustrates another example of a diagram of light reflection in a cross-section of a MOT housing in accordance with an aspect of the invention.

FIG. 5 illustrates another example of a diagram 200 of light reflection in a cross-section of a MOT housing 202 in accordance with an aspect of the invention. The MOT housing 202 can correspond to the MOT housing 12 of the MOT system 10 in the example of FIG. 1. Therefore, reference is to be made to the example of FIG. 1 in the following description of the example of FIG. 5.

The MOT housing 202 is demonstrated in the example of FIG. 5 as substantially surrounding an atom trapping region 204. The MOT housing 202 includes a first housing section 208, a second housing section 210, and a third housing section 211. The first housing section 208 is demonstrated as extending between the second and third housing sections 210 and 211 and substantially encloses the atom trapping region 204. The third housing section 211 is demonstrated as extending from a second end 212 of the MOT housing 202 that includes an aperture 214 to the first housing section 208. The second housing section 210 extends from the first housing section 208 to a first end 216 of the MOT housing 202 that is substantially open. The entirety of the interior surface of the MOT housing 202 can be substantially reflective.

In the example of FIG. 5, collimated light beams 218 are provided into the first end 216 of the MOT housing 202, such as from the light source 20 in the example of FIG. 1. The first housing section 208 of the MOT housing 202 can be arranged to have a 45° angle with respect to a plane that is normal to the central axis 206. Therefore, the portion of the collimated light beams 218 that strike the interior peripheral surface of the first housing section 208 are orthogonally reflected toward the central axis 206. As a result, the light beams 218 generate an optical force toward the central axis 206 which, combined with the quadrupole magnetic field, traps the atoms in the MOT housing 202 along the central axis 206. The light beams 218 continue to propagate past the central axis 206 to be orthogonally reflected back out of the opening of the first end 216. In addition, the MOT housing 202 includes an optical mask 220 that is substantially centered at a point along the central axis 206 to occlude the trapping region 204 from direct illumination from the collimated light beams 218. Therefore, there is substantially no optical force in the direction of the central axis 206 resulting from direct illumination of the light beams 218. Accordingly, substantially none of the light beams 218 emanate from the aperture 214 to provide an optical force on the atoms that are emitted from the aperture 214 as a cold atom beam.

Figure 6:
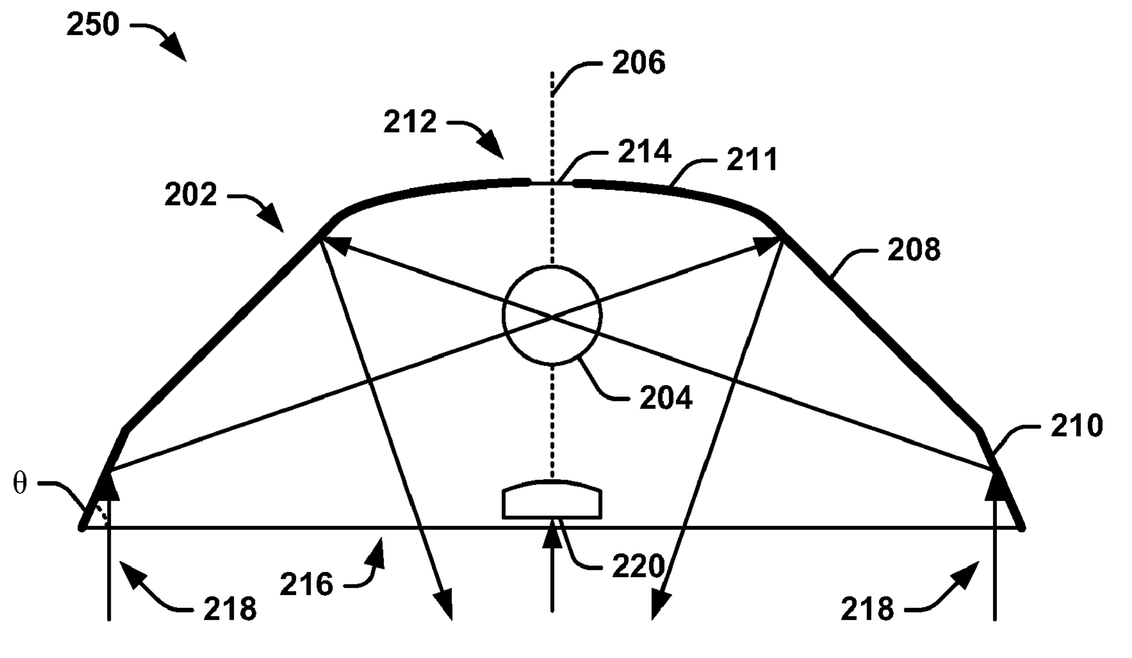
FIG. 6 illustrates another example of a diagram of light reflection in a cross-section of a MOT housing in accordance with an aspect of the invention.

FIG. 6 illustrates another example of a diagram 250 of light reflection in a cross-section of the MOT housing 202 in accordance with an aspect of the invention. In the examples of FIG. 6, the second housing section 210 of the MOT housing 202 can be arranged to have an angle θ with respect to a plane that is normal to the central axis 206. The angle θ is demonstrated in the example of FIG. 3 to be an acute angle that is greater than 45°. Therefore, the second housing section 210 is configured to reflect the light beams 218 at an angle that directs the light beams 218 toward the atom trapping region 204. The illumination of the light beams 218 on the atoms that are trapped in the atom trapping region 204 thus creates an optical force having a force component in the direction of the aperture 214 along the central axis 206. As a result, the atoms that are trapped in the atom trapping region 204 are emitted from the aperture 214 as a cold atom beam. The light beams 218 that are reflected toward the atom trapping region 204 are reflected again from the interior peripheral surface of the first housing section 208 back out of the opening of the first end 216. Thus, none of the light beams 218 that reflect from the interior peripheral surface of the second housing section 210 are emitted from the aperture 214, and thus do not provide an optical force on the atoms subsequent to being emitted from the aperture 214 as a cold atom beam. Similar to as described above in the examples of FIGS. 3 and 4, the magnitude of the optical force component toward the aperture 214 can be controlled in a variety of ways.

Figure 7:
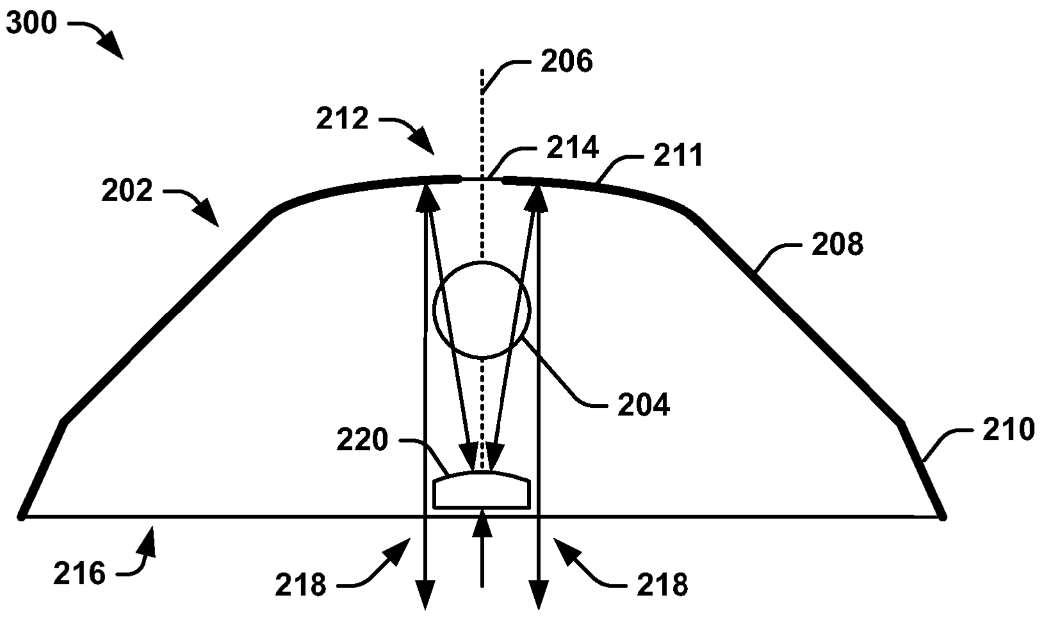
FIG. 7 illustrates another example of a diagram of light reflection in a cross-section of a MOT housing in accordance with an aspect of the invention.

FIG. 7 illustrates another example of a diagram 300 of light reflection in a cross-section of the MOT housing 202 in accordance with an aspect of the invention. In the example of FIG. 7, the third housing section 211 of the MOT housing 202 is configured as a substantial parabola and has an interior peripheral surface that is substantially reflective. Therefore, the third housing section 211 is configured to reflect the light beams 218 toward a focal point that is associated with the shape of the parabola configuration of the third housing section 211. As an example, the focal point can be located at a point on the central axis 206 that is opposite the optical mask 220 from the third housing section 211.

In addition, in the example of FIG. 7, the surface of the optical mask 220 that faces the third housing section 211 can likewise be configured as a substantial parabola, and can be substantially reflective. Therefore, the light beams 218 that strike the third housing section 211 are reflected toward the focal point, and thus strike the substantially reflective surface of the optical mask 220. Based on the parabolic shape of the reflective surface of both the optical mask 220 and the third housing section 211, the light beams 218 are re-reflected back from the optical mask 220 along the same optical mask from which they were reflected from the interior peripheral surface of the third housing section 211. Accordingly, the light beams 218 are re-reflected back from the third housing section 211 and out of the opening of the first end 216. Thus, based on the presence of the optical mask 220 and the configuration of the reflective surface of the optical mask 220 and the third housing section 211, none of the light beams 218 that reflect from the interior peripheral surface of the third housing section 211 are emitted from the aperture 214, and thus do not provide an optical force on the atoms subsequent to being emitted from the aperture 214 as the cold atom beam. Furthermore, based on the reflection of the light beams 218 between the third housing section 211 and the reflective surface of the optical mask 220, the volume of the atom trapping region can be substantially reduced by providing an additional component of optical force in the direction toward the central axis 206 resulting from the light beams 218.

Figure 8:
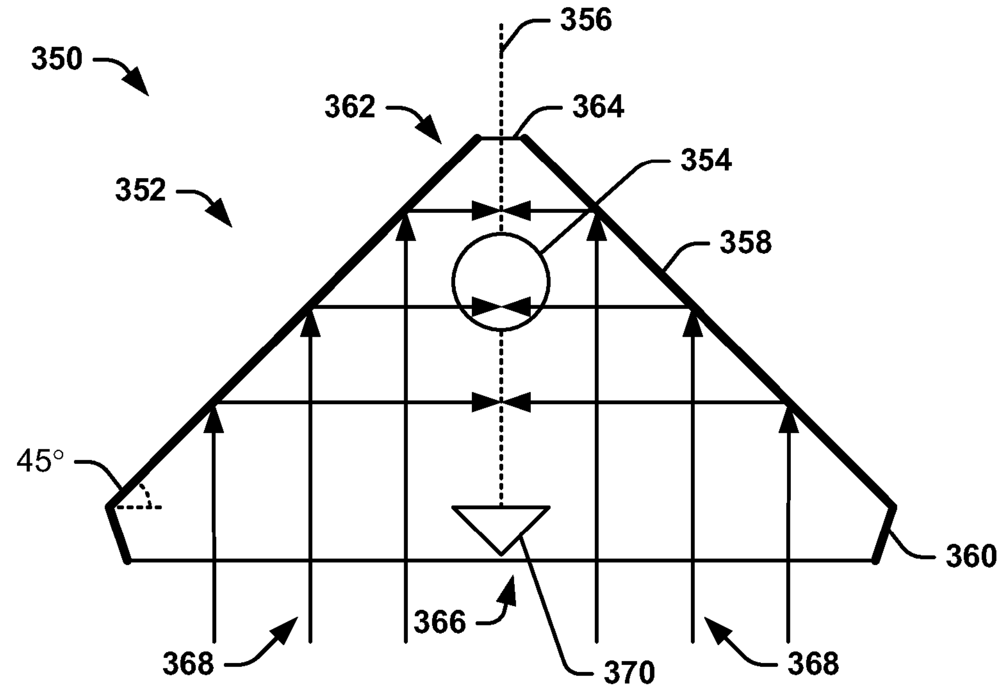
FIG. 8 illustrates another example of a diagram of light reflection in a cross-section of a MOT housing in accordance with an aspect of the invention.

FIG. 8 illustrates another example of a diagram 350 of light reflection in a cross-section of a MOT housing 352 in accordance with an aspect of the invention. The MOT housing 352 can correspond to the MOT housing 12 of the MOT system 10 in the example of FIG. 1. Therefore, reference is to be made to the example of FIG. 1 in the following description of the example of FIG. 8.

The MOT housing 352 is demonstrated in the example of FIG. 8 as substantially surrounding an atom trapping region 354. The MOT housing 352 includes a first housing section 358 and a second housing section 360. The first housing section 358 is demonstrated as extending from a second end 362 of the MOT housing 352 that includes an aperture 364 and substantially encloses the atom trapping region 354. The second housing section 360 extends from the first housing section 358 to a first end 366 of the MOT housing 352 that is substantially open. The entirety of the interior surface of the MOT housing 352 can be substantially reflective.

In the example of FIG. 8, collimated light beams 368 are provided into the first end 366 of the MOT housing 352, such as from the light source 20 in the example of FIG. 1. The first housing section 358 of the MOT housing 352 can be arranged to have a 45° angle with respect to a plane that is normal to the central axis 356. Therefore, similar to as described above regarding the example of FIG. 2, the portion of the collimated light beams 368 that strike the interior peripheral surface of the first housing section 358 are orthogonally reflected toward the central axis 356 to generate an optical force toward the central axis 356 which, combined with the quadrupole magnetic field, traps the atoms in the MOT housing 352 along the central axis 356. The light beams 368 continue to propagate past the central axis 356 to be orthogonally reflected back out of the opening of the first end 366. In addition, the MOT housing 352 includes an optical mask 370 that is substantially centered at a point along the central axis 356 to occlude the trapping region 354 from direct illumination from the collimated light beams 368. Therefore, there is substantially no optical force in the direction of the central axis 356 resulting from direct illumination of the light beams 368. Accordingly, substantially none of the light beams 368 emanate from the aperture 364 to provide an optical force on the atoms that are emitted from the aperture 364 as a cold atom beam.

Figure 9:
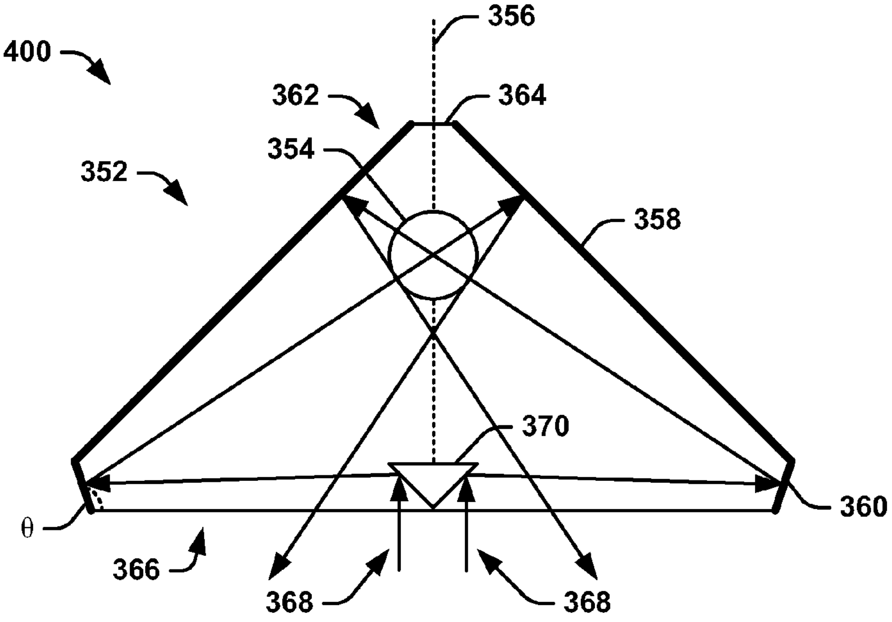
FIG. 9 illustrates another example of a diagram of light reflection in a cross-section of a MOT housing in accordance with an aspect of the invention.

FIG. 9 illustrates another example of a diagram 400 of light reflection in a cross-section of the MOT housing 352 in accordance with an aspect of the invention. In the examples of FIG. 9, the second housing section 360 of the MOT housing 352 can be arranged to have an angle θ with respect to a plane that is normal to the central axis 356. The angle θ is demonstrated in the example of FIG. 9 to be an obtuse angle. In addition, in the example of FIG. 9, the surface of the optical mask 370 that faces out the opening of the first end 366 can include a substantially angular surface, such as being configured as substantially conical or pyramidal, and can be substantially reflective. Therefore, the light beams 368 that strike the optical mask 370 are reflected toward the interior peripheral surface of the second housing section 360.

The second housing section 360 is therefore configured to reflect the light beams 368 at an angle that directs the light beams 368 toward the atom trapping region 354. The illumination of the light beams 368 on the atoms that are trapped in the atom trapping region 354 thus creates an optical force having a force component in the direction of the aperture 364 along the central axis 356. As a result, the atoms that are trapped in the atom trapping region 354 are emitted from the aperture 364 as a cold atom beam. The light beams 368 that are reflected toward the atom trapping region 354 are reflected again from the interior peripheral surface of the first housing section 358 back out of the opening of the first end 366. Thus, none of the light beams 368 that reflect from the interior peripheral surface of the second housing section 360 are emitted from the aperture 364, and thus do not provide an optical force on the atoms subsequent to being emitted from the aperture 364 as the cold atom beam. Similar to as described above in the examples of FIGS. 3 and 4, the magnitude of the optical force component toward the aperture 364 can be controlled in a variety of ways.

Figure 10:
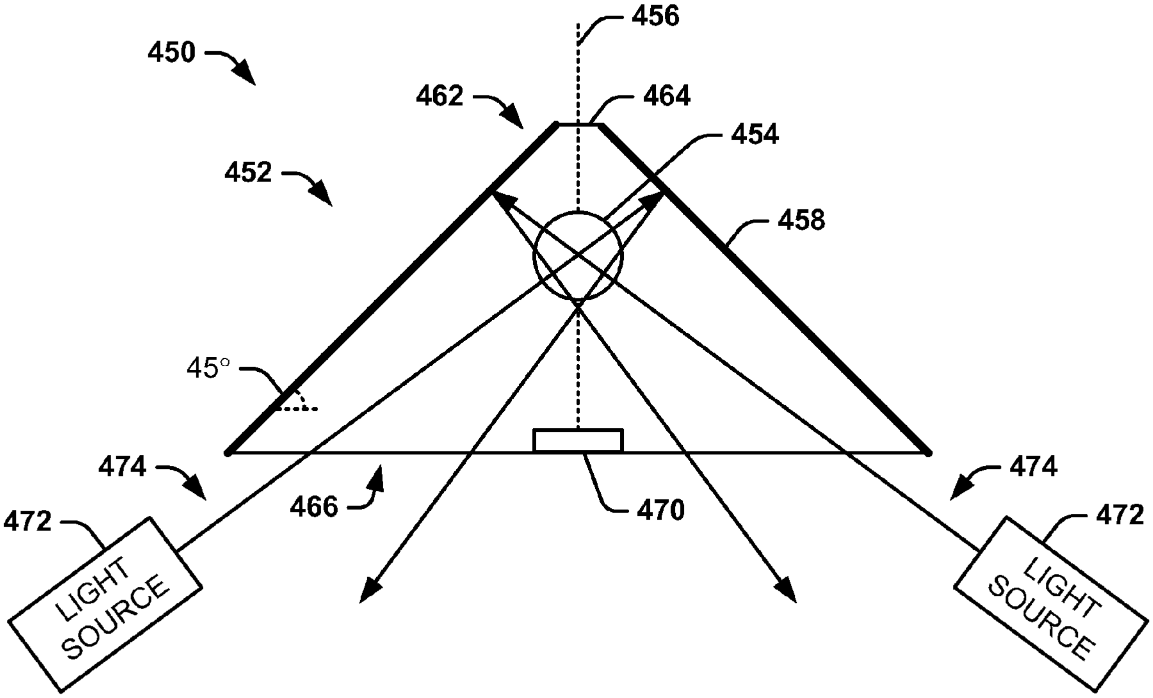
FIG. 10 illustrates another example of a diagram of light reflection in a cross-section of a MOT housing in accordance with an aspect of the invention.

FIG. 10 illustrates another example of a diagram 450 of light reflection in a cross-section of a MOT housing 452 in accordance with an aspect of the invention. The MOT housing 452 can correspond to the MOT housing 12 of the MOT system 10 in the example of FIG. 1. Therefore, reference is to be made to the example of FIG. 1 in the following description of the example of FIG. 10.

The MOT housing 452 is demonstrated in the example of FIG. 10 as substantially surrounding an atom trapping region 454. The MOT housing 452 includes only a single housing section 458 that is demonstrated as extending from a second end 462 of the MOT housing 452 that includes an aperture 464 to a first end 466 of the MOT housing 452 that is substantially open. The interior surface of the MOT housing 452 can be substantially reflective. Similar to as described above regarding the examples of FIGS. 2, 5, and 8, the housing section 458 can be arranged to have a 45° angle with respect to a plane that is normal to the central axis 456. Thus, collimated light beams (not shown) are provided into the first end 466 of the MOT housing 452, such as from the light source 20 in the example of FIG. 1, and are orthogonally reflected toward the central axis 456 to generate an optical force toward the central axis 456 which, combined with the quadrupole magnetic field, traps the atoms in the MOT housing 452 within the trapping region 454. The MOT housing 452 also includes an optical mask 470, similar to as described above, that is substantially centered at a point along the central axis 456 to occlude the trapping region 454 from direct illumination from the collimated light beams 468.

In addition, in the example of FIG. 10, a pair of additional light sources 472 generate light beams 474 that propagate into the open first end 466 and toward the atom trapping region 454. The additional light sources 472 are demonstrated as being arranged outside the perimeter of the open first end 466, such that they do not occlude the collimated light beams that are generated from the light source, such as the light source 20 in the example of FIG. 1. In addition, the light sources 472 are configured as diametrically opposed with respect to each other, such that the light beams 474 generate an optical force having a force component in the direction of the aperture 464 along the central axis 456. As a result, the atoms that are trapped in the atom trapping region 454 are emitted from the aperture 464 as a cold atom beam. The light beams 474 propagate through the atom trapping region 454 to be reflected from the interior peripheral surface of the housing section 458 back out of the opening of the first end 466.

The example of FIG. 10 is not limited to two light sources 472, but could include any number of additional light sources 472 that are arranged to generate the light beams 474 to have a net optical force along the central axis 456. In addition, the light sources 472 can be arranged at an angle with respect to the central axis 456, and thus with respect to the illumination of the atoms in the atom trapping region 454 that can be set to control the magnitude of the optical force. As an example, the angle at which the light sources 472 are arranged can be dynamic, such as to provide an adjustable control of the optical force on the atoms in the atom trapping region 454 during operation of the associated MOT system.

Figure 11:
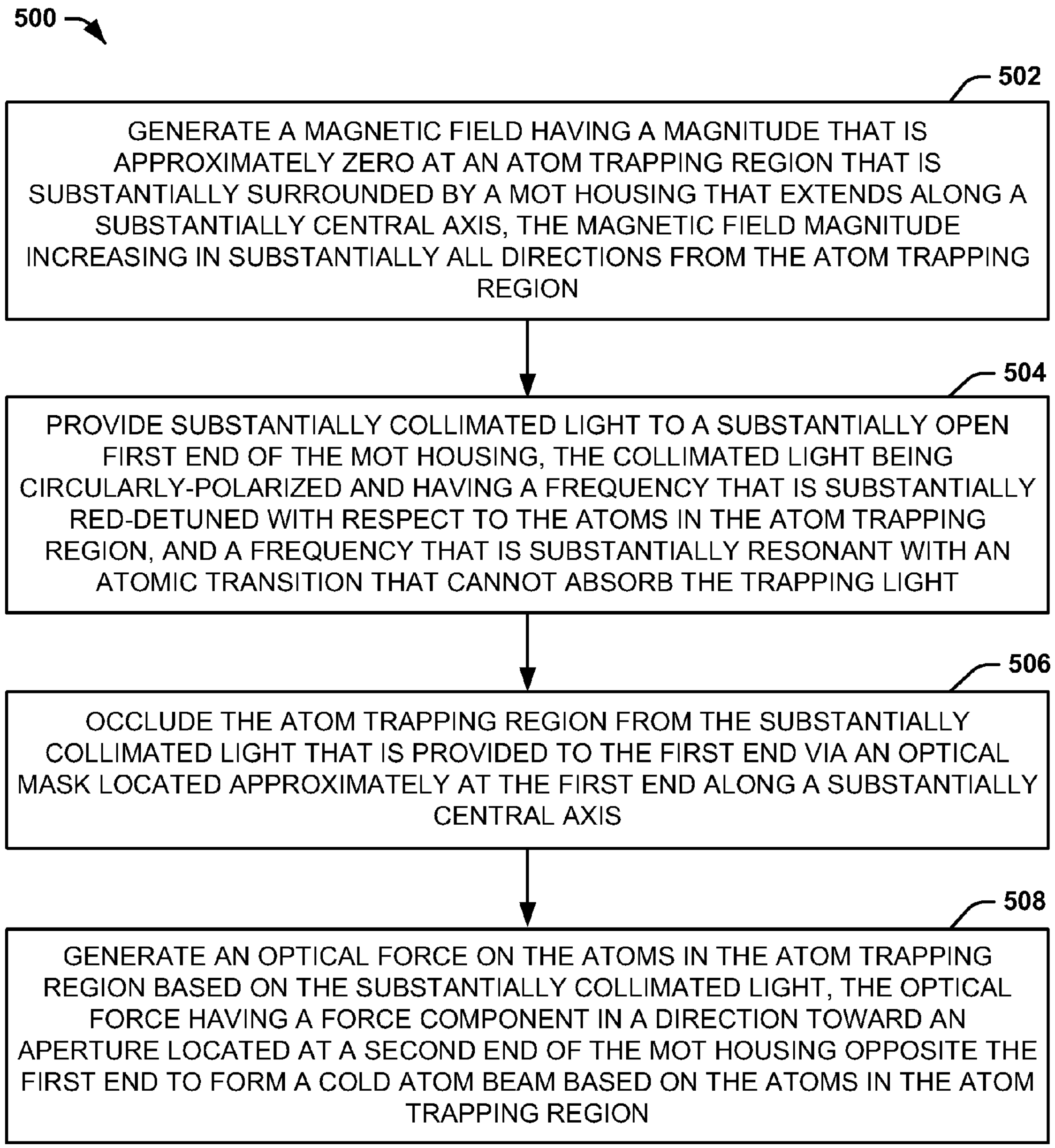
FIG. 11 illustrates an example of a method for generating a cold atom beam in accordance with an aspect of the invention.

In view of the foregoing structural and functional features described above, a methodology in accordance with various aspects of the invention will be better appreciated with reference to FIG. 11. While, for purposes of simplicity of explanation, the methodology of FIG. 11 is shown and described as executing serially, it is to be understood and appreciated that the invention is not limited by the illustrated order, as some aspects could, in accordance with the invention, occur in different orders and/or concurrently with other aspects from that shown and described herein. Moreover, not all illustrated features may be required to implement a methodology in accordance with an aspect of the invention.

FIG. 11 illustrates an example of a method 500 for generating a cold atom beam in accordance with an aspect of the invention. At 502, a magnetic field is generated having an magnitude that is approximately zero at an atom trapping region that is substantially surrounded by a MOT housing that extends along a substantially central axis, the magnetic field magnitude increasing in substantially all directions from the atom trapping region. The magnetic field can be a quadrupole magnetic field. At 504, substantially collimated light beams are provided to a substantially open first end of the MOT housing, the light being circularly-polarized and having a frequency that is substantially red-detuned with respect to atoms in the atom trapping region and a frequency that is nominally on resonance with a second atom transition and a frequency that is substantially resonant with an atomic transition that cannot absorb the trapping light. The red-detuned frequency can be a frequency that is slight less than a resonant frequency associated with the atoms in the atom trapping region.

At 506, the atom trapping region is occluded from the light that is provided to the first end via an optical mask located approximately at the first end along a substantially central axis. The optical mask can have a reflective surface that is substantially parabolic that faces the aperture, or is angular and faces the open first end of the MOT housing. At 508, an optical force is generated on the atoms in the atom trapping region based on the substantially collimated light, the optical force having a force component in a direction toward an aperture located at a second end of the MOT housing opposite the first end to form the cold atom beam based on the atoms in the atom trapping region. The optical force can include a trapping force that is based on orthogonally reflected light from an interior peripheral surface of a first housing section. The optical force can also be based on light that is reflected from a second housing section toward the atom trapping region to provide the component of optical force in the direction of the aperture.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A magneto-optical trap (MOT) housing that substantially surrounds atoms in an atom trapping region, the MOT housing comprising:

a first end that is substantially open to receive light that is substantially collimated;

a second end opposite the first end and comprising an aperture that emits a cold atom beam from the atom trapping region;

a housing section surrounding and extending along a substantially central axis that extends through the atom trapping region and the aperture, the housing section having a substantially reflective interior peripheral surface that reflects the light to generate an optical force on the atoms; and an optical mask located substantially at the first end and along the substantially central axis that is configured to occlude the atom trapping region from the light to substantially prevent direct illumination of the atoms by unreflected light.

2. The MOT housing of claim 1, wherein the housing section is a first housing section that orthogonally reflects the light to generate an optical force on the atoms along the substantially central axis, the MOT housing further comprising a second housing section coupled to the first housing section and surrounding and extending along the substantially central axis, the second housing section having a substantially reflective interior peripheral surface that reflects the light in a direction toward the atom trapping region to generate an optical force on the atoms in the atom trapping region in a direction toward the aperture.

3. The MOT housing of claim 2, wherein the first housing section is arranged at a first angle with respect to a plane that is normal to the substantially central axis, and wherein the second housing section is arranged at a second angle with respect to a plane that is normal to the substantially central axis, the second angle being greater than the first angle and having a magnitude that dictates a magnitude of the optical force on the atoms in the atom trapping region in the direction toward the aperture.

4. The MOT housing of claim 2, further comprising a third housing section coupled to the first housing section opposite the second housing section and surrounding and extending along the substantially central axis, the third housing section having a substantially parabolic shape with a focal point along the substantially central axis on an opposite side of the optical mask from the atom trapping region and having a substantially reflective interior peripheral surface that reflects the light toward the optical mask to substantially provide a third axis of trapping force acting upon the atoms.

5. The MOT housing of claim 4, wherein the optical mask has a first surface facing the aperture and a second surface facing away from the first opening, the first surface having a substantially parabolic shape and a substantially reflective surface to retro-reflect the light that is reflected from the third region along a propagation axis back to the third region along the propagation axis.

6. The MOT housing of claim 2, wherein the second housing section is arranged at an obtuse angle with respect to a plane that is normal to the substantially central axis, and wherein the optical mask has a first surface facing the aperture and a second surface facing away from the first opening, the second surface having a substantially reflective angular surface to reflect the light received at the first end to the second region.

7. The MOT housing of claim 1, wherein the light is circularly-polarized and has a frequency that is substantially red-detuned with respect to the atoms.

8. The MOT housing of claim 1, wherein the substantially reflective interior peripheral surface of the housing section is partially reflective to allow a portion of the light to pass through the substantially reflective interior peripheral surface and exit the MOT housing to control the optical force.

9. A MOT system comprising the MOT housing of claim 1, the MOT system further comprising:

a magnetic field generator configured to generate a quadrupole magnetic field having an magnitude that is approximately zero at the atom trapping region and increasing in substantially all directions from the atom trapping region; and a light source configured to generate the light that is substantially collimated and circularly-polarized and having the substantially red-detuned frequency with respect to the atoms.

10. The MOT system of claim 9, further comprising at least one additional light source configured to generate second light that is directed into the first end at an angle to illuminate the atom trapping region in a manner that generates an optical force on the atoms in the atom trapping region in a direction toward the aperture.

11. A method for generating a cold atom beam, the method comprising:

generating a magnetic field having a magnitude that is approximately zero at an atom trapping region that is substantially surrounded by a magneto-optical trap (MOT) housing that extends along a substantially central axis, the magnetic field magnitude increasing in substantially all directions from the atom trapping region;

providing substantially collimated light to a substantially open first end of the MOT housing;

occluding the atom trapping region from the light that is provided to the first end via an optical mask located approximately at the first end along a substantially central axis; and generating an optical force on the atoms in the atom trapping region based on the substantially collimated light, the optical force having a force component in a direction toward an aperture located at a second end of the MOT housing opposite the first end to form the cold atom beam based on the atoms in the atom trapping region.

12. The method of claim 11, wherein generating the optical force comprises:

reflecting the substantially collimated light orthogonally from an interior peripheral surface of a first housing section of the MOT housing to generate the optical force on the atoms toward the substantially central axis; and reflecting the substantially collimated light from an interior peripheral surface of a second housing section of the MOT housing coupled to the first housing section in a direction toward the atom trapping region to generate the component of the optical force in the direction toward the aperture.

13. The method of claim 11, wherein providing the substantially collimated light comprises providing first substantially collimated light from a light source, wherein generating the optical force comprises:

reflecting the first substantially collimated light from the light source orthogonally from an interior peripheral surface of a first housing section of the MOT housing to generate the optical force on the atoms toward the substantially central axis; and providing second substantially collimated light from at least one additional light source to the substantially open first end of the MOT housing and substantially through the atom trapping region to generate the component of the optical force in the direction toward the aperture.

14. The method of claim 11, further comprising controlling the magnitude of the force component in the direction toward the aperture based on adjusting a distribution of intensity of the substantially collimated light with respect to the first end of the MOT housing.

15. The method of claim 11, further comprising controlling the magnitude of the force component in the direction toward the aperture based on adjusting a frequency of the substantially collimated light.

16. The method of claim 11, further comprising controlling the magnitude of the force component in the direction toward the aperture based on adjusting an angle at which the substantially collimated light passes through the atom trapping region.

17. A magneto-optical trap (MOT) housing that substantially surrounds atoms in an atom trapping region, the MOT housing comprising:

a first end that is substantially open to receive light that is substantially collimated;

a second end opposite the first end and comprising an aperture that emits a cold atom beam from the atom trapping region;

a first housing section surrounding and extending along a substantially central axis that extends through the atom trapping region and the aperture, the housing section having a substantially reflective interior peripheral surface that orthogonally reflects the light to generate an optical force on the atoms toward the substantially central axis;

a second housing section coupled to the first housing section and surrounding and extending along the substantially central axis, the second housing section having a substantially reflective interior peripheral surface that reflects the light in a direction toward the atom trapping region to generate an optical force on the atoms in the atom trapping region in a direction toward the aperture; and an optical mask located substantially at the first end and along the substantially central axis that is configured to occlude the atom trapping region from the light to substantially prevent direct illumination of the atoms by unreflected light.

18. The MOT housing of claim 17, further comprising a third housing section coupled to the first housing section opposite the second housing section and surrounding and extending along the substantially central axis, the third housing section having a substantially parabolic shape with a focal point along the substantially central axis on an opposite side of the optical mask from the atom trapping region and having a substantially reflective interior peripheral surface that reflects the light toward the optical mask to substantially provide a third axis of trapping force acting upon the atoms.

19. The MOT housing of claim 18, wherein the optical mask has a first surface facing the aperture and a second surface facing away from the first opening, the first surface having a substantially parabolic shape and a substantially reflective surface to retro-reflect the light that is reflected from the third region along a propagation axis back to the third region along the propagation axis.

20. The MOT housing of claim 17, wherein the second housing section is arranged at an obtuse angle with respect to a plane that is substantially normal to the substantially central axis, and wherein the optical mask has a first surface facing the aperture and a second surface facing away from the first opening, the second surface having a substantially reflective angular surface to reflect the light received at the first end to the second region.

* * * * *